United States Patent
Park et al.

(10) Patent No.: US 6,718,102 B2
(45) Date of Patent: Apr. 6, 2004

(54) TUBE-ENCLOSED OPTICAL CABLE CONTAINING RIBBON UNITS

(75) Inventors: Euy-don Park, Kumi-shi (KR); Byung-gon Lee, Kumi-shi (KR); Sung-yeoul Park, Daegu-shi (KR)

(73) Assignee: LG Cable Ltd., Seoul (KR)

( * ) Notice: Subject to any disclaimer, the term of this patent is extended or adjusted under 35 U.S.C. 154(b) by 0 days.

(21) Appl. No.: 10/330,882

(22) Filed: Dec. 30, 2002

(65) Prior Publication Data

US 2003/0123823 A1 Jul. 3, 2003

Related U.S. Application Data

(63) Continuation of application No. PCT/KR01/01828, filed on Oct. 29, 2001.

(30) Foreign Application Priority Data

Apr. 26, 2001 (KR) ......................................... 2001-22764

(51) Int. Cl.[7] ................................................. G02B 6/44
(52) U.S. Cl. ........................ 385/114; 385/104; 385/109; 385/113
(58) Field of Search ................................. 385/103, 104, 385/109–114

(56) References Cited

U.S. PATENT DOCUMENTS 6,574,400 B1 * 6/2003 Lail ............................ 385/109
6,577,796 B2 * 6/2003 Anelli et al. ................. 385/112
2003/0026559 A1 * 2/2003 VanVicke et al. ............ 385/112

* cited by examiner

Primary Examiner—Hemang Sanghavi
(74) Attorney, Agent, or Firm—Nath & Associates PLLC; Harold L. Novick

(57) ABSTRACT

The present invention relates to a tube-enclosed optical cable containing ribbon units, and more specifically to a tube-enclosed optical cable containing ribbon units which can improve the economical efficiency of the process by simplifying the manufacturing process of optical cable and at the same time can improve the water blocking capability and compression characteristics of optical cable, providing optical cable characterized by coating particularly the central member of the cable with an absorptive substance and optical cable characterized by inserting interstices coated with an absorptive substance into the empty spaces between one more tubes encircling the central member and the sheath enclosing the tubes.

15 Claims, 3 Drawing Sheets

TUBE-ENCLOSED OPTICAL CABLE CONTAINING RIBBON UNITS

This application is a continuation application of International application number PCT/KR01/01828 filed Oct. 29, 2001 entitled TUBE-ENCLOSED OPTICAL CABLE CONTAINING RIBBON UNITS, which designated the United States, the entire contents of which are hereby incorporated by reference in their entirety.

BACKGROUND OF THE INVENTION

1. Field of the Invention

The present invention relates to a tube-enclosed optical cable containing ribbon units, and more specifically to a tube-enclosed optical cable containing ribbon units which can improve the economical efficiency of the process by simplifying the manufacturing process of optical cable and at the same time can improve the water blocking capability and compression characteristics of optical cable, by providing optical cable characterized by coating particularly the central member of the cable with an absorptive substance and optical cable characterized by inserting interstices coated with an absorptive substance into the empty spaces between one or more tubes encircling the central member and the sheath enclosing the tubes.

2. Description of Prior Art

Optical cables are widely used for transmitting electric and electronic signals in television, computers and telephones, and are getting more and more spotlight since they can transmit a huge amount of information compared with the conventional coaxial cable in particular. But the optical fibers used in such optical cables are very small in diameter, vulnerable to impact and easily damaged by contact especially with moisture. So there has been an acute demand for such an optical cable with a structure that can protect it from moisture and external impact, and accordingly, optical cables having a variety of structures have been developed.

As an example from the prior art, FIG. 1 shows the structure of the optical cable presented in the U.S. Pat. No. 5,229,851. As illustrated in the drawing, the optical cable comprises a central member 10, one or more liquid impermeable tubes 16 encircling the central member in an alternating hand helix at a given distance, one or more ribbon units 14 received loosely in the inside of the tube, and a sheath 20 of a plastic material enclosing the liquid impervious tubes; and to protect optical fiber from moisture and external impact, all the empty spaces between the inner membrane of the sheath and tube and between the tubes are filled with jelly-like water blocking substance 12.

But for actual connection and use of the cables, it is necessary to pull out optical fibers from optical cables. If the jelly-like water blocking substance is filled in the cable, the jelly should be removed as well to pull out the optical fiber. So the drawback is that hands or the equipment can be contaminated from the jelly, and due to the viscosity of the jelly itself, the process of filling it takes a lot of time. This could lead to lowering of the yield rate and economical efficiency of the process in general. And as the jelly may not be filled completely in the empty spaces between tubes, it is a fact that a satisfactory pressure characteristic has not been obtained yet.

Therefore, researches have been continued to make up for such drawbacks, and as a result the optical cable having the structure as shown in FIGS. 2 and 3 has been developed. The optical cables shown in FIGS. 2 and 3 disclosed in U.S. Pat. No. 5,621,841. First, the optical cable shown in FIG. 2, as shown in FIG. 1 above, comprises a central member 10, tubes 16 encircling the central member 10 in an alternating hand helix, ribbon units 14 located in the inside of the tube 16, and sheath 20 encircling the tubes 16. In this optical cable, the spaces between the tubes 16 are filled with waterproof yarns 24, and the tubes 16 are first wrapped with waterproof tapes 22 and then enclosed with sheath 20 of a plastic material.

That is, in the optical cable, by using waterproof tapes wrapping waterproof yarns and ribbons instead of the jelly-form water blocking substance, they have solved the problem arising from using the jelly-form water blocking substance. But the waterproof yarns are consisting of powder or fine thread containing superabsorbent polymer, and in the optical cable such waterproof yarns are exposed to the outside during the cable assembling process. Since the tube could be rubbed against the surface of waterproof yarn, dust could be created. This dust can be a factor of making products defective and impeding the cleanliness in the factory, which is a problem that can cause a lowering of the economical efficiency and yield rate of the process.

Also in the optical cable shown in FIG. 3, the ribbon-type optical cable comprising central member 10, tube 16, ribbon units and sheath 20 is characterized by having a structure wherein waterproof tapes 26 longitudinally wrap around the central member and waterproof yarns fill the empty spaces between the tubes. This also cannot solve the problem arising from the optical cable shown in FIG. 2. Moreover, according to the structure shown in FIG. 3, separate equipment and process are necessary for longitudinal wrapping of waterproof tapes in the cable assembling process. And since waterproof tapes need to be exchanged while working, continuous work becomes difficult, which leads to a lowering of the economical efficiency of the process. And longitudinal wrapping of tapes may create gaps between tapes, which can cause reduction of the water blocking characteristic of the cable.

As a structure for solving the problem of the pressure characteristic reduction and the bending characteristic in the optical cables in FIGS. 2 and 3, there is optical cable by U.S. Pat. No. 6,014,487 that has a structure as shown in FIG. 4. Referring to FIG. 4, the cable in the ribbon-type optical cable comprising a central member 10, tubes 16 filled with jelly-like water blocking substance 12 and ribbon units 14, and sheath 20, is characterized by having a structure wherein interstices 28 are inserted into the empty spaces between tubes 16 for improving the pressure characteristic of the cable, and water swellable members 24 are placed around the interstices 28. By inserting the interstices of a plastic material, the pressure characteristic of the cable can be improved and it can prevent moisture from being absorbed in the cable through water blocking members around the interstices. But since the interstice itself cannot have any water blocking characteristic, a sufficient water blocking characteristic of the cable cannot be obtained. And by using yarn as the water blocking member, dust can be created by yarn during the cable assembling process. And because it becomes necessary to perform complicated work involving simultaneous arrangement of the tubes, interstices and water blocking members, a lowering of productivity becomes another problem.

Due to such problems in prior art, there is an acute demand for the optical cable having a structure that has excellent water blocking and pressure characteristics and which can maximize economical efficiency since the process is simple and does not create contaminating materials.

SUMMARY OF THE INVENTION

It is an object of this invention to provide a tube-enclosed optical cable containing ribbon units that has an excellent water blocking characteristic but can be produced by a simple process, and can prevent creation of dust by waterproof yarn, by coating the absorptive substance itself on the central member and forming water swellable members of non-jelly substance between tube twist and polyethylene sheath, in order to solve the problems of the conventional optical cables.

It is another object of this invention to provide a tube-enclosed optical cable containing ribbon units that has excellent pressure and water blocking characteristics but can be produced by a simple process, and can prevent creation of dust from waterproof yarn, by inserting interstices coated with absorptive substance into the empty spaces between tubes and sheath of a plastic material, in the optical cable having the structure.

In accordance with this present invention a tube-enclosed optical cable containing ribbon units comprises a central member with the surface coated with absorptive substance; at least one or more tubes filled with water blocking substance capable of preventing permeation of moisture into the inside, containing at least one or more optical fibers, and encircling the central member at a given distance in an alternating hand helix; a sheath of a plastic material enclosing the tubes; and water swellable members of non-jelly substance formed between the twist of the tubes and sheath to prevent permeation of moisture into the inside of the cable.

BRIEF DESCRIPTION OF DRAWINGS

Other objects and aspects of the present invention will become apparent from the following description of embodiments with reference to the accompanying drawing in which.

DESCRIPTION OF THE PREFERRED EMBODIMENTS

Figure 1:
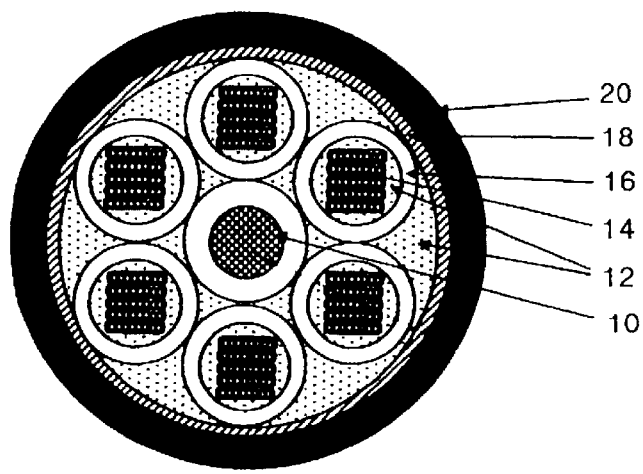
FIGS. 1 through 4 are drawings showing the structures of optical cable by prior art.
Figure 2:
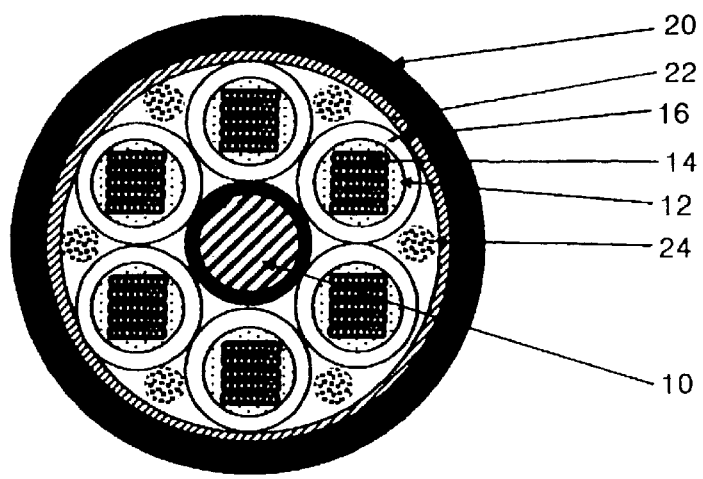
Figure 3:
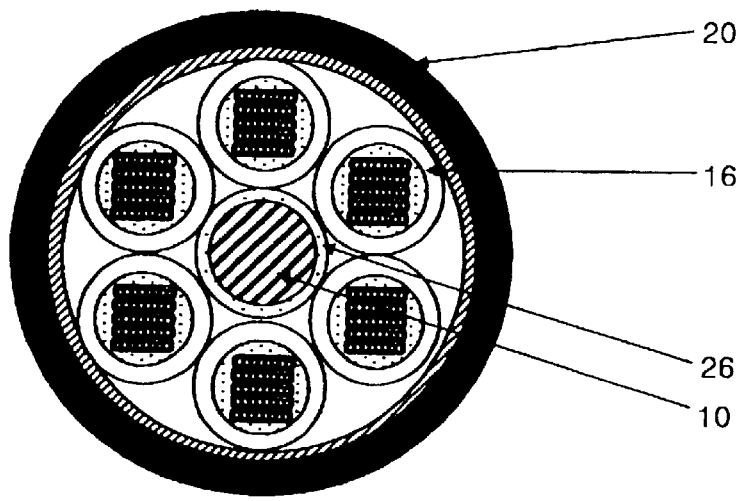
Figure 4:
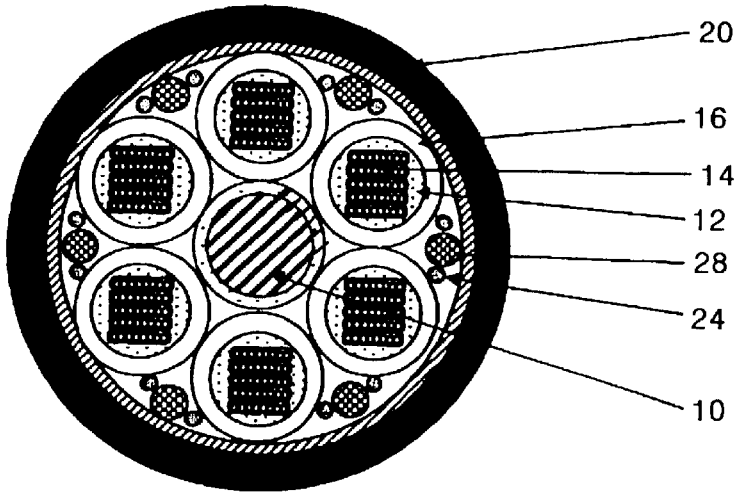
Figure 5:
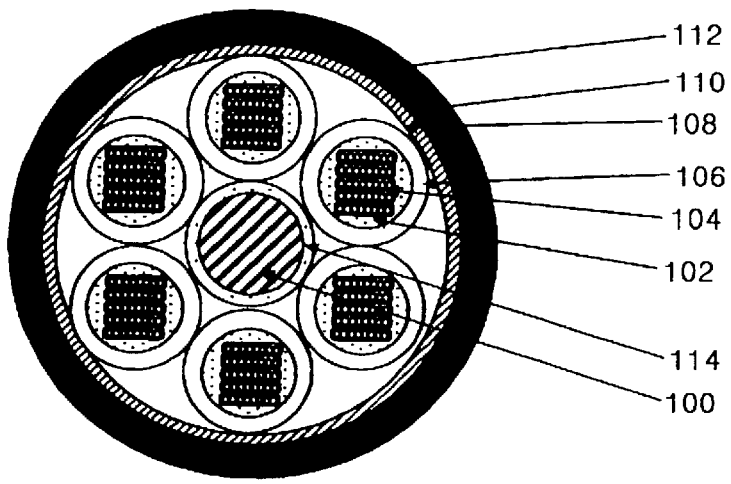
FIG. 5 is the drawing showing the structure of the optical cable by the present invention, wherein the central members are coated with absorptive substance.

As shown is FIG. 5, the optical cable of the present invention comprises a central member 100 with the surface coated with absorptive substance 114, at least one or more tubes 106 filled with water blocking substance 102 capable of preventing permeation of moisture inside and ribbon units 104, containing at least one or more optical fibers, and encircling the central member at a given distance in an alternating hand helix, sheath 112 of a plastic material enclosing the tubes 106 and including a sub tensional material 110; and water swellable members 108 of non-jelly substance formed between the twist of the tubes and sheath to prevent permeation of moisture inside the cable.

The tube-enclosed optical cable containing ribbon units 114 of the present invention can have, unlike in prior art, the manufacturing process simplified by coating absorptive substance around the central member 100 and forming water swellable members 108 of non-jelly substance, and can have excellent water blocking characteristics, because creation of dust by water blocking yarn can be prevented, and at the same time, the reduction of water blocking characteristics that can happen at the time of longitudinal wrapping of tapes does not occur.

As the absorptive substance in the optical cable, it is desirable to use thermoplastic resin bonded to a small amount of absorptive polymer; and especially as the thermoplastic resin, it is desirable to use polyolefin resin.

However, as the polyolefin resin, any general resins such as polyethylene and polypropylene resin may be used, but it is desirable to use polyethylene; and as a representative example of absorptive substance with absorptive polymer bonded to polyethylene resin as mentioned above, there is polyethylene vinyl acetate by formula 1 below.

formula 1

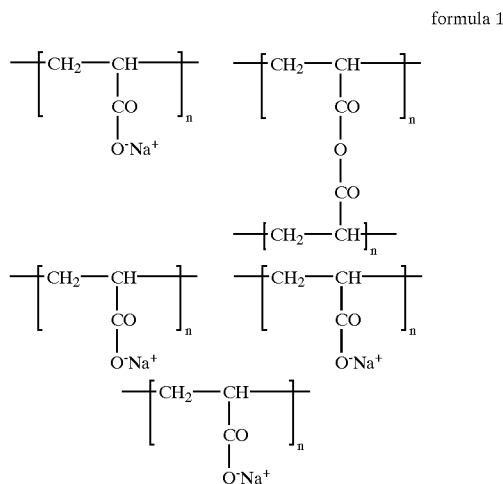

As mentioned above, by using thermoplastic substance bonded to absorptive polymer as the absorptive, the absorptive substance can be coated easily by the method of extruding the absorptive substance in the central member, so a separate process or system as in the case of longitudinally wrapping water blocking tapes becomes unnecessary; and the coating process of the central member and the tube assembling work around the central member can be progressed almost simultaneously from solidifying quickly after extrusion. Therefore, the optical cable manufacturing process can become simple.

Let us take a brief look at the mechanism whereby such absorptive substance absorbs moisture in the substance by the formula 1. First, when the substance contacts water molecules, sodium ions, that were bonded to oxygen atoms of acetate radical, they coordinate bond to oxygen of water molecules to have a structure of formula 2 below. Through such a mechanism, moisture is absorbed. Especially, the substance of the formula 1 does not produce any byproduct at the time of moisture absorption, so generation of contaminants can be minimized and the water blocking characteristic of optical cable can be maximized.

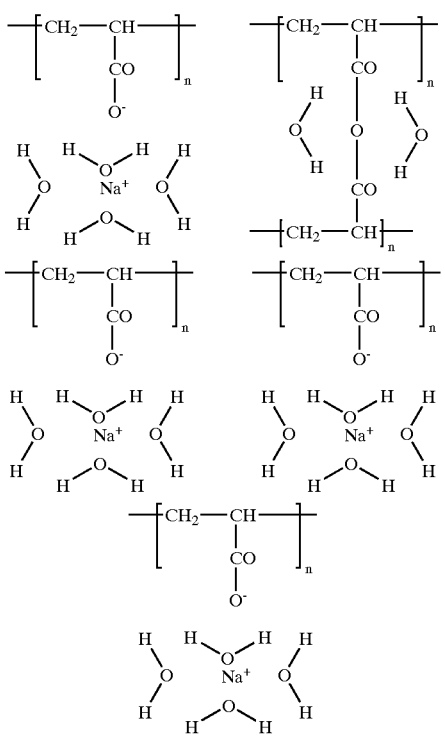

formula 2

In the optical cable, as water blocking material of non-jelly substance formed between the tubes and sheath, any material used as a conventional water blocking material may be used, but it is desirable to use nonmetallic tension bar containing especially waterproof tapes or superabsorbent polymer. By using such a water blocking substance, we can prevent creation of dust that could happen when using the conventional waterproof yarns and maximize the water blocking characteristic of cable.

Figure 6:
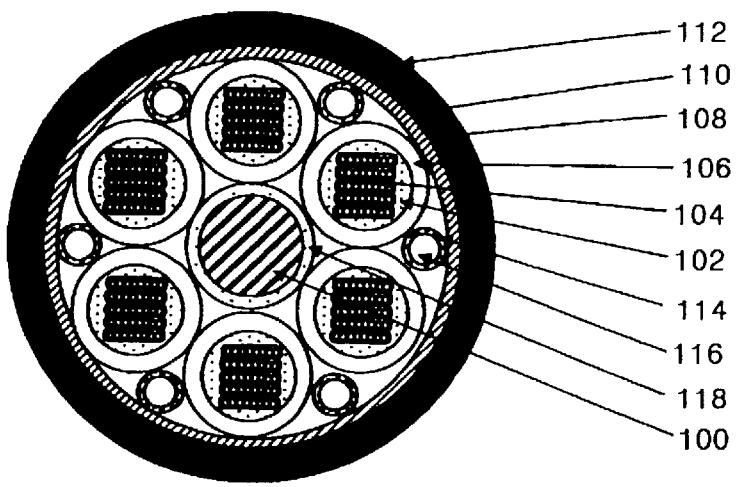
FIG. 6 is the drawing showing the structure of the optical cable by the present invention, wherein coated interstices are inserted into the empty spaces between tubes and sheath enclosing the tubes.

To improve the pressure characteristics as mentioned above, as shown in FIG. 6, the optical cable of the present invention comprises a central member 100 surrounded by non-jelly water blocking substance; at least one or more tubes 106, which is filled with waterproof substance 102 capable to block the permeation of moisture inside and ribbon units 104, contains at least one or more optical fibers, and is wrapped in an alternating hand helix at a given distance around the central member 100; a sheath 112 of a plastic material enclosing the tubes 106 and including a sub tensional material 110; interstices 116 of a plastic material located in the empty spaces between the tubes and sheath and coated with absorptive substance 114.

The optical cable contains interstices of a plastic material, so it is possible to improve the pressure characteristics of the cable, and at the same time, since the interstice itself is coated with absorptive substance, it is not necessary to place separate water blocking substance around the interstice like in prior art, so the manufacturing process becomes simple. And since the interstice itself has a water blocking characteristic, it is possible to improve the permeation blocking capability of the cable and to prevent the creation of dust by waterproof yarn.

In the optical cable, as a non-jelly water blocking substance surrounding the central member, it is desirable to use one selected from the group consisting of waterproof yarn, waterproof tapes, and absorptive substances.

Also, as an absorptive substance coated on the interstice or the absorptive substance surrounding the central member, it is possible to use the substance that is the same as the substance used in the first embodiment of the present invention.

And as a material of interstices, any of general plastic may be used, but it is desirable to use one selected from the group consisting of polyethylene, polypropylene, and polyvinyl chloride (PVC) resign.

Moreover, in the optical cable, the water blocking characteristic of the optical cable can be further improved by additionally forming non-jelly waterproof material between the sheath and tube twist.

And as the non-jelly waterproof material, it is possible to use the member as used in the first embodiment of the present invention.

By this invention, the water blocking characteristic can be improved, the optical cable manufacturing process can be made simple, creation of dust can be prevented, and the productivity of the work process can be improved because continuous operation is possible regardless of cable length. In the structure of the optical cable, it is possible to maximize the pressure and water blocking characteristics of optical cable without a separate additional process by inserting interstices of a plastic material coated with absorptive substance into the empty spaces between the tubes and sheath.

What is claimed is:

1. A tube-enclosed optical cable containing ribbon units, the optical cable comprising:

a central member with the surface coating with absorption substance;

at least one or more tubes filled with water blocking substance capable of preventing permeation of moisture inside, containing at least one or more optical fibers, and encircling the central member at a given distance in an alternating hand helix;

a sheath of a plastic material enclosing the tubes; and water swellable members of non-jelly substance formed between the twist of the tubes and sheath to prevent permeation of moisture inside the cable.

2. An optical cable of claim 1, wherein the absorption substance is thermoplastic resin bonded to a small amount of absorption polymer.

3. An optical cable according to claim 2, wherein the thermoplastic resin is polyolefin resin.

4. An optical cable according to claim 3, wherein the polyolefin resin is polyethylene.

5. An optical cable according to claim 1, wherein the absorptive substance is the material by formula 1 below:

formula 1

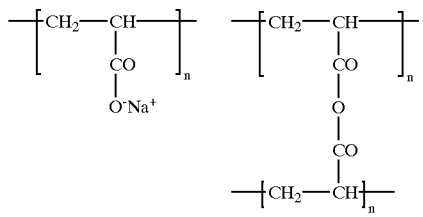

-continued

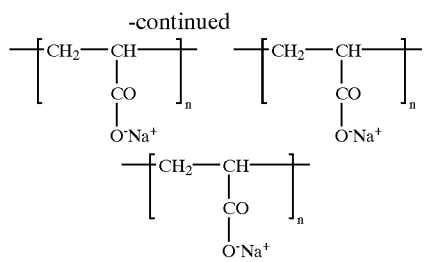

6. An optical cable according to claim 1, wherein the water blocking material of non-jelly substance is nonmetallic tension bar comprising waterproof tapes or superabsorbent polymer.

7. A tube-enclosed optical cable containing ribbon units, the optical cable comprising:
 a central member surrounded by non-jelly water blocking substances;
 at least one or more tubes, which is filled with waterproof substance capable to block the permeation of moisture inside, contains at least one or more optical fibers, and is wrapped in an alternating hand helix at a given distance around the central member;
 a sheath of a plastic material enclosing the tubes; and interstices of a plastic material located in the empty spaces between the tubes and sheath and coated with absorptive substance.

8. An optical cable of claim 7, wherein the non-jelly water blocking substance is one selected from the group consisting of waterproof tapes, waterproof yarn, and absorptive substances.

9. An optical cable of claim 7, wherein the absorptive substance is thermoplastic resin bonded to a small amount of absorptive polymer.

10. An optical cable according to claim 9, wherein the thermoplastic resin is polyolefin resin.

11. An optical cable according to claim 10, wherein the polyolefin resin is polyethylene.

12. An optical cable according to claim 7, wherein the absorptive substance is the material by formula 1 below:

formula 1

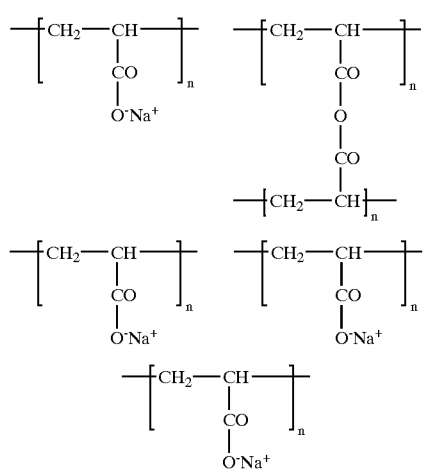

13. An optical cable according to claim 7, wherein the material of interstices is one selected from the group consisting of polyethylene, polypropylene, and polyvinyl chloride (PVC) resin.

14. An optical cable according to claim 7, further comprising non-jelly waterproof material formed between the sheath and tube twist.

15. An optical cable according to claim 14, wherein the water blocking material of non-jelly substance is nonmetallic tension bar comprising waterproof tapes of superabsorbent polymer.

* * * * *